(No Model.)

S. BERGMANN & G. B. SCOTT.
REGULATION OF ELECTRIC MOTORS.

No. 424,595.  Patented Apr. 1, 1890.

Witnesses
Inventors
George B. Scott
Sigmund Bergmann
By their attorneys
Gifford & Bull

UNITED STATES PATENT OFFICE.

SIGMUND BERGMANN, OF NEW YORK, N. Y., AND GEORGE B. SCOTT, OF LAKEWOOD, NEW JERSEY.

REGULATION OF ELECTRIC MOTORS.

SPECIFICATION forming part of Letters Patent No. 424,595, dated April 1, 1890.

Application filed November 23, 1889. Serial No. 331,368. (No model.)

*To all whom it may concern:*

Be it known that we, SIGMUND BERGMANN, of New York, in the State of New York, and GEORGE B. SCOTT, of Lakewood, Ocean county, and State of New Jersey, have conjointly invented a certain new and useful Improvement in Electric Motors, of which the following is a specification.

The object of our improvement is to provide a simple and efficient regulator for an electric motor.

We will describe an electric motor embodying the improvement, and then point out the novel features in claims.

Figure 1:
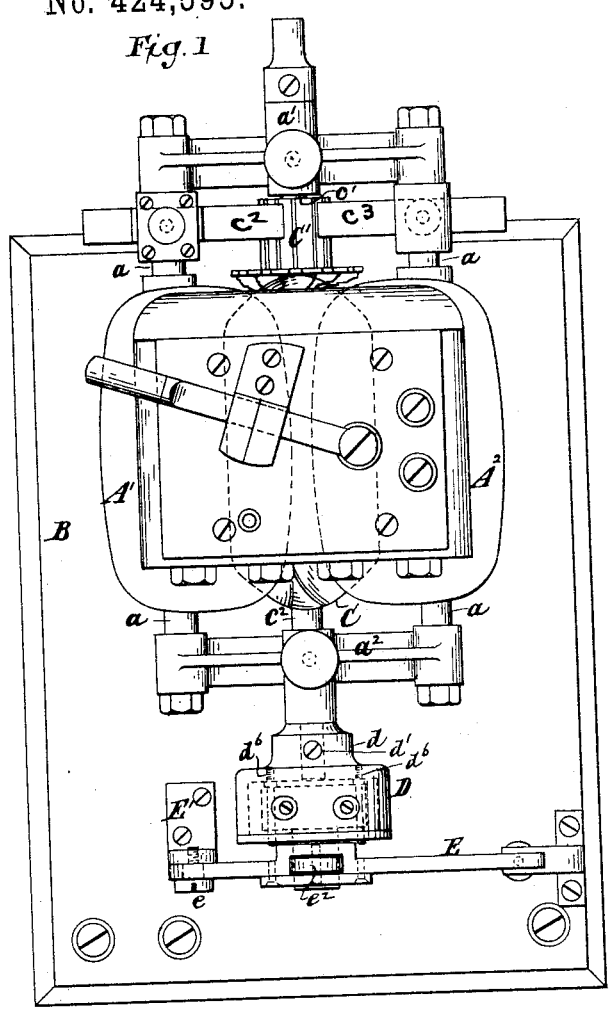
Figure 2:
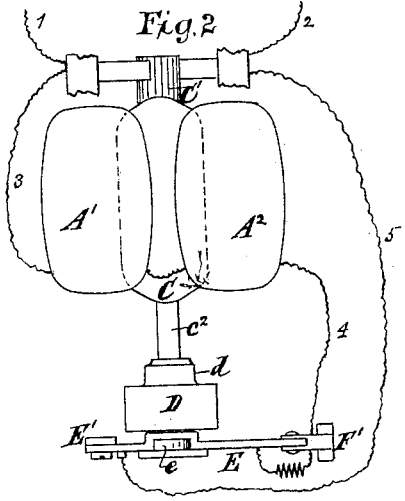
Figure 4:
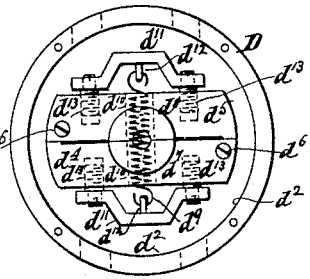
Figure 5:
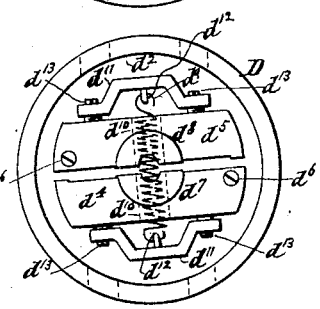
Figure 6:
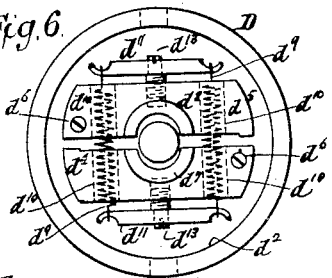
Figures 3, 7:
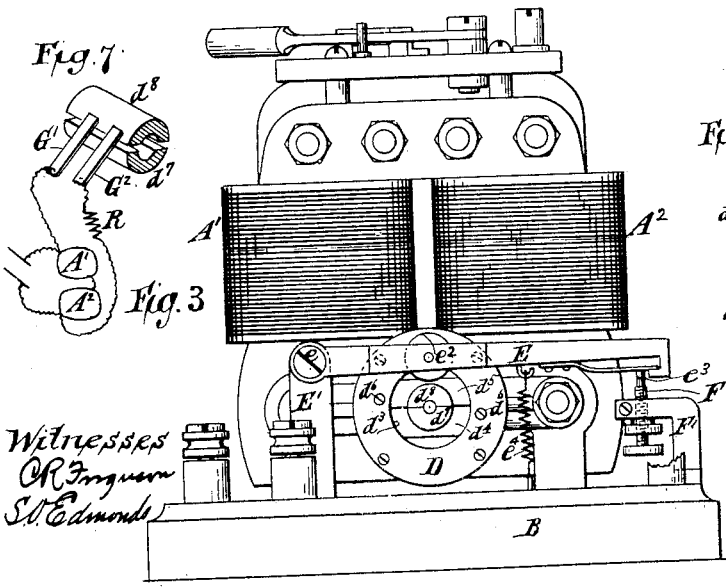

In the accompanying drawings, Figure 1 is a top view of an electric motor embodying our improvement. Fig. 2 is a diagram illustrating the circuit. Fig. 3 is an end view of the motor. Fig. 4 is an enlarged end view of the same with the outer plate removed. Fig. 5 is a view similar to Fig. 4, but represents certain parts in different positions. Fig. 6 is a view similar to Figs. 4 and 5, but illustrates a modified construction. Fig. 7 is a diagram illustrating a modification.

Similar letters of reference designate corresponding parts in all the figures.

$A'$ $A^2$ designate the field-magnets of the machine. They are supported by a bed-piece B, which may be of any suitable construction. Between their poles rotates an armature C, whose journals $c'$ $c^2$ are sustained by bearings $a'$ $a^2$, which as here shown are secured to the poles of the field-magnets by rods $a$. The journal $c'$ of this armature has secured to it a commutator-wheel $C'$, and combined with this are brushes $C^2$ $C^3$, secured to the rods $a$, which support the bearing for the journal that is provided with the said wheel. All these parts may be of ordinary construction.

The journal $c^2$ of the armature has secured to it a cylinder D, which at one end has a hub $d$, constructed to fit the end of the journal. This hub may be in any way secured to the journal—as, for instance, by a set-screw $d'$, passing through a tapped hole in the hub and impinging against the journal. In the cylinder forward of the hub $d$ is a cavity $d^2$, which at the outer end is closed by a plate having a central hole $d^3$, of smaller diameter than the cavity $d^2$. This plate may be secured in place by screws or otherwise. In the cavity $d^2$ are arranged two arms $d^4$ $d^5$. These are arranged in parallel positions, their meeting surfaces occupying the position of a diameter of the cylinder. Each is pivoted at one end to the cylinder, in the present instance by a screw $d^6$, passing through the plate at the outer end of the cylinder at a point adjacent to the hole $d^3$ and entering tapped holes in the back of the cylinder. These arms are pivoted in place at opposite ends, and hence each one is adapted to swing away from the other. These two arms are provided with opposite semi-cylindric projections $d^7$ $d^8$, which protrude through the hole $d^3$ of the cylinder. Normally the arms are close together, and their projections $d^7$ $d^8$ together form a cylinder or wheel. The arms are impelled toward one another by a spring $d^9$, here shown as made of helical form and extending through holes $d^{10}$, with which the arms are provided about midway between their ends. These arms have bridges $d^{11}$ secured to them on their outer or most distant sides, and these bridges cross the holes $d^{10}$ and are provided with hooks $d^{12}$, which engage with the ends of the spring $d^9$, so that the spring will exert its force through the bridges to pull the arms toward each other.

$d^{13}$ are screws which engage with tapped holes in the arms and have heads or outer portions which are of smaller diameter than the bodies and are inverted. The bridges $d^{11}$ have holes which fit the heads or outer portions of the screws. Evidently, therefore, the tension of the spring $d^9$ may be varied by turning these screws $d^{13}$, for by turning the latter in one direction the bridges may be moved farther from the arms, so as to put a greater tension upon the spring, and by turning them in the reverse direction the bridges may be allowed to move closer to the arms, so as to relax the tension upon the spring. When the armature attains a certain speed of rotation, the arms are intended to fly apart. The time when this happens will obviously be regulated by varying the tension of the spring $d^9$.

E designates a lever, which may be made of metal. It is pivoted by a screw $e$ to a standard E', erected upon the bed-piece B. One of the circuit-wires extends to this lever. The lever is provided with a wheel $e^2$ of insulating material, which extends over the cylinder or wheel formed of the semi-cylindric projections $d^7 d^3$ on the arms $d^4 d^5$. This lever at one end is provided with a contact-piece $e^3$, which coacts with a contact piece or screw F, supported by a bracket F', erected upon the bed-piece B. A spring $e^4$, fastened at one end to the lever E and at the other to the bed-piece B, draws down the lever, so that its contact-piece $e^3$ will impinge against the contact-piece F. The contact-piece F is in the circuit, as I will presently describe. Preferably the contact-piece $e^3$ of the lever E will be arranged upon a metal spring attached to the lever, so that whenever the lever after being raised is pulled downwardly it will not jar or make any undue noise.

The regulator consisting of the arms $d^4 d^5$ and their semi-cylindric projections will be set by adjusting the tension of the spring, drawing them together so as to have no effect until the armature of the motor acquires a certain speed, whereupon the arms will be moved apart by centrifugal force and their projections will raise the lever E, and thereby separate the contact-piece $e^3$ of the latter from the contact-piece F.

Looking at the diagram, Fig. 2, it will be seen that 1 2 are the leading-in wires extending to the brushes of the motor, that from one of the brushes a wire 3 extends to one of the field-magnets, that from the other field-magnet a wire 4 extends to the standard of the contact-piece F, and that from the other brush a wire 5 extends to the standard of the lever E. Evidently, therefore, when the contact-piece $e^3$ is separated from the contact-piece F the field will be temporarily opened, and in this way the motor may be regulated. If it be preferred to introduce a resistance rather than open the field, a resistance device R may be connected by wires to the contact-piece F and lever E or to the standards of these parts, so that whenever the lever is moved to an extent sufficient to effect the separation of the contact-piece $e^3$ from the contact-piece F this resistance device will be introduced.

It may sometimes be desired to arrange the regulator between the ends of a journal. This will be possible if, instead of employing a single spring extending through a hole in the arms $d^4 d^5$ midway of their ends, two springs be employed and arranged nearer the ends of the arms. Such springs may be connected with the ends of the bridges, and the screws for adjusting the bridges may be arranged midway of the ends of the bridges. We have illustrated this by Fig. 6.

In Fig. 7 $d^7 d^3$ designate the projections from arms $d^4 d^5$, such as we have heretofore described. Over these two springs arms $G' G^2$ extend. These are connected with the coils of the field-magnets A by wires, one of which is introduced into a resistance device R. Whenever the projections move apart sufficiently to touch the springs, the fields or portions thereof may be short-circuited.

What we claim as our invention, and desire to secure by Letters Patent, is—

1. The combination, with an electric motor, of a regulator consisting of arms pivoted in place at one end, a spring for drawing the same together, a projection from each of said arms together forming an expansible cylinder or wheel, and a lever or arm extending over said projections in the direction of the arms, and arranged in the electric circuit, substantially as described.

2. The combination, with an electric motor, of a regulator consisting of arms pivoted in place at one end, a spring for drawing the same together, a projection from each of said arms together forming an expansible cylinder or wheel, and a lever or arm operated thereby and arranged in the electric circuit, substantially as specified.

3. The combination, with an electric motor, of a regulator consisting of arms pivoted in place at one end, a spring for drawing the same together, bridges adjustably connected to the arms and having the spring fastened thereto, segmental projections from said arms forming an expansible cylinder or wheel, and a lever or arm operated thereby and arranged in the electric circuit, substantially as specified.

4. The combination, with an electric motor, of a regulator consisting of arms pivoted in place at one end, a spring for drawing the same together, projections from said arms forming an expansible cylinder or wheel, a lever or arm operated thereby and arranged in the electric circuit, a spring attached to said lever and provided with a contact-piece, and a contact-piece on the bed of the machine, substantially as specified.

5. The combination, with an electric motor, of a regulator consisting of a cylinder rotated from the armature, arms pivoted at opposite ends within the cylinder and provided with segmental projections, a spring for drawing the arms together, means, substantially such as described, for varying the tension of the spring, and a lever or arm in the electric circuit actuated by the said segmental projections, substantially as specified.

6. The combination, with an electric motor, of a regulator consisting of arms pivoted in place at one end and normally close together, a semi-cylindrical projection on each of said arms together forming a cylinder or wheel, a spring for drawing said arms together, and a lever or arm operated by the projections and having connection with the electric circuit, substantially as specified.

7. The combination, with an electric motor, of a regulator consisting of arms pivoted in place at one end, a projection on each of said arms, a spring for drawing the arms together, and a lever in the electrical circuits having an insulated bearing on the projections and operated by said projections, substantially as specified.

8. The combination, with the armature of an electric motor, of a cylinder fitted to a journal of the armature and having a cavity, a plate closing the end of said cavity and having a hole through its center, parallel arms pivoted to the cylinder within the cavity and having semi-cylindrical projections extending from the arms through the hole in the plate, a lever in the electrical circuit operated by the projections, and a spring for drawing the arms together, substantially as specified.

SIGMUND BERGMANN.
GEO. B. SCOTT.

Witnesses:
D. R. SANFORD,
ORLANDO J. SCHARFF.